J. A. ANDERSON.
TIRE MENDER TOOL.
APPLICATION FILED JULY 6, 1914.
1,141,082.
Patented May 25, 1915.
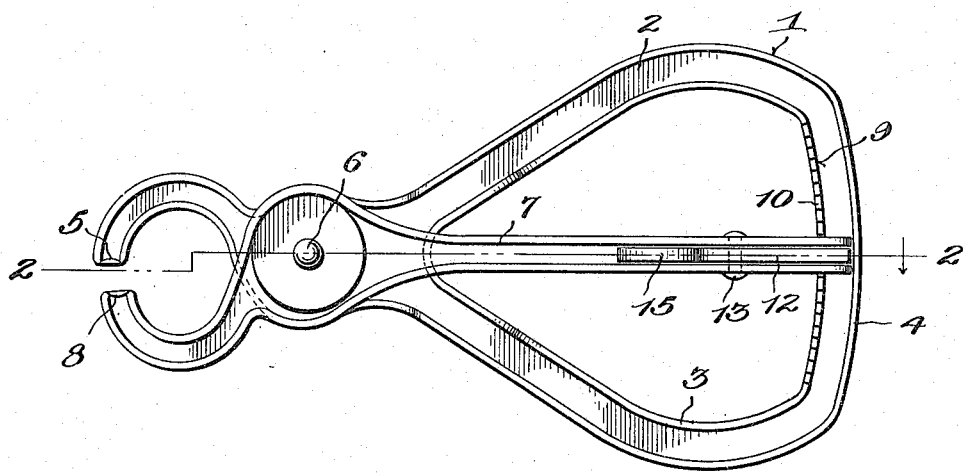
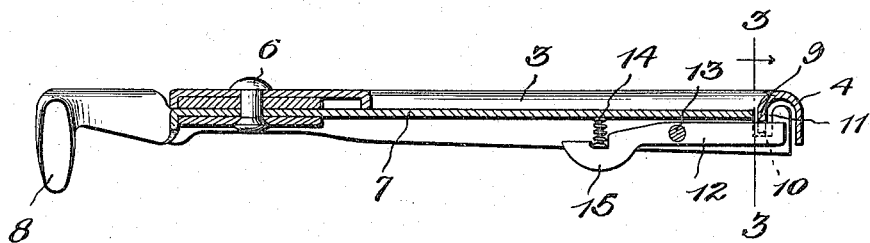
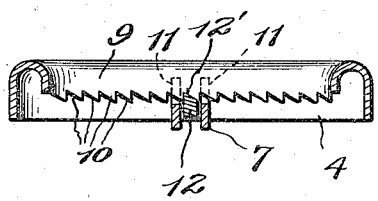
Inventor
John A. Anderson.
Witnesses

UNITED STATES PATENT OFFICE.

JOHN A. ANDERSON, OF BRIDGEPORT, CONNECTICUT.

TIRE-MENDER TOOL.

1,141,082.

Specification of Letters Patent.

Patented May 25, 1915.

Application filed July 6, 1914. Serial No. 849,241.

*To all whom it may concern:*

Be it known that I, JOHN A. ANDERSON, a citizen of the United States, residing at the city of Bridgeport, county of Fairfield, State of Connecticut, have invented certain new and useful Improvements in Tire-Mender Tools; and I do declare the following to be a full, clear, and exact description of the invention, such as will enable others skilled in the art to which it appertains to make and use the same.

This invention relates to certain new and useful improvements in tools for repairing automobile tire shoes.

When the shoe of an automobile tire becomes cut, sand will work beneath the same and the tire will soon blister unless the flap of the cut is cleaned out and firmly cemented back into place, the present invention having for its primary object the provision of a tool which may be inserted in the cut operate to spread the walls which the cut forms, and be automatically held in spreading position, so as to thus leave both hands of the operator free to clean out the cut and cement same.

Further, the invention aims to provide means for attaining the purpose mentioned which is capable of easy and quick operation and which will act to positively hold the tool in operative or spreading position.

In the drawings: Figure 1 is a plan view of the invention; Fig. 2 is a section on the line 2—2 of Fig. 1; and Fig. 3 is a similar view on the line 3—3 of Fig. 2.

The invention consists of a member 1, formed to provide a pair of sides 2, 3, which conjointly provide a hand grip to enable the tool to be gripped with one hand of the operator. The sides 2, 3, are connected rigidly by an end member 4, one of the sides 2, being extended to form a jaw 5. The hand gripping member 1 has pivotally connected thereto at 6, a member 7 which has a jaw 8 formed on one end, which jaw coöperates with the jaw 5, and is disposed opposite to same. The members 1 and 7 are preferably formed so as to have a cross-section of U-shape or channel form as indicated in the drawings, which has the advantage of light weight, strength, and a rounded hand engaging surface which enables the operator to grip the member 1, without discomfort.

The inner wall 9 of the end member 4 is provided with a series of ratchet teeth 10, and the end of the member 7, opposite to the end which has the jaw 8 is slotted at 11, so as to receive the wall 9. A pawl 12 is pivoted at 13 in the channel of the member 7, and is beveled at 12' to engage the ratchet teeth 10, as depicted in Fig. 3 of the drawings. A coil spring 14 engages between the pawl and the bottom of the channel of member 7, and moves the pawl normally into engagement with the teeth 10. The part of the pawl adjacent to the spring 14 projects outwardly from the channel of member 7, and is curved at 15 to provide a finger engaging face by means of which the pawl may be easily depressed to disengage the end 12' thereof from the teeth 10.

In operation, the pawl is released from teeth 10, and the member 7 is moved to bring the jaws 5 and 8 together whereupon the jaws are inserted in the cut and the member 7 then moved to cause its jaw to separate from the jaw 5, thus spreading the cut by engagement of the jaws with the walls which the cut forms. The member 7, upon movement to the limit of spreading of the walls of the cut in the tire, will be automatically held in its position, since in the movement of the member 7, the pawl 12 is riding on the ratchet teeth 10, and will prevent return movement of the member by virtue of such engagement with the teeth 10, whereby it will be observed that the device can be manipulated with but use of one hand, and in addition after the jaws have been spread to the desired extent, the same will be automatically held by the pawl, thus leaving both of the hands of the operator free to perform the cleaning and cementing process. To release the member 7, it is merely necessary to press inwardly on the end 15 of the pawl against the action of spring 14, to free the end 12' of the pawl from engagement with the ratchet teeth, as will be obvious.

What is claimed is:

1. In a tire tool, a member having divergent sides to enable same to be gripped with and in one hand of the user, said member having a jaw at one end and having a rack at its opposite end which rack rigidly connects the sides of the member, a second member having a jaw which coöperates with the jaw of the first named member and having its opposite end terminating substantially at the rack, and means on the opposite end of the second member to releasably engage the rack.

2. In a tire tool, a substantially triangular member of channel form having its sides providing opposite parts to be gripped with and in one hand of the user and having the free edge of the inner wall of its base provided with rack teeth, a jaw on the apex of said member, a second member of channel form pivoted to the apex of said triangular member and having a jaw which coöperates with the jaw of the latter, and a spring pressed pawl pivoted in the channel of the second member and being engaged with said rack teeth.

3. In a tire tool, a substantially triangular rigid member forming a complete hand grip in itself, a jaw on said member, a second member pivoted to the first member and located within the bounds thereof and having a jaw, which coöperates with the first named jaw, and means on the second member to lock same to the first member.

In testimony whereof I affix my signature in presence of two witnesses.

JOHN A. ANDERSON.

Witnesses:
F. W. SMITH, Jr.,
M. T. LONGDEN.

Copies of this patent may be obtained for five cents each, by addressing the "Commissioner of Patents, Washington, D. C."